(12) United States Patent
Palahnuk et al.

(10) Patent No.: US 8,086,676 B2
(45) Date of Patent: Dec. 27, 2011

(54) CONTACT AGGREGATOR

(75) Inventors: Samuel Louis Palahnuk, Burbank, CA (US); Robert Bonev, Grand Forks, ND (US)

(73) Assignee: Smooth Productions Inc., Wilmington, DE (US)

( * ) Notice: Subject to any disclaimer, the term of this patent is extended or adjusted under 35 U.S.C. 154(b) by 427 days.

(21) Appl. No.: 12/141,097

(22) Filed: Jun. 18, 2008

(65) Prior Publication Data

US 2009/0157717 A1 Jun. 18, 2009

Related U.S. Application Data (60) Provisional application No. 61/051,339, filed on May 7, 2008, provisional application No. 61/014,422, filed on Dec. 17, 2007.

(51) Int. Cl.
*G06F 15/16* (2006.01)
*G06F 17/00* (2006.01)

(52) U.S. Cl. ........ 709/206; 709/200; 709/205; 707/609; 707/677

(58) Field of Classification Search ............ 709/206, 709/223, 224; 707/101, 102, 103 X, 609, 707/677
See application file for complete search history.

(56) References Cited

U.S. PATENT DOCUMENTS

| | | | |
|---|---|---|---|
| 6,480,830 B1 | 11/2002 | Ford et al. | |
| 6,590,568 B1 | 7/2003 | Astala et al. | |
| 6,694,353 B2 | 2/2004 | Sommerer | |
| 6,978,246 B1 | 12/2005 | Ruvolo et al. | |
| 7,383,254 B2 | 6/2008 | Wen et al. | |
| 7,441,194 B2 | 10/2008 | Vronay et al. | |
| 7,519,663 B1 | 4/2009 | Bostick et al. | |
| 7,526,762 B1 | 4/2009 | Astala et al. | |
| 7,721,210 B2 | 5/2010 | Mansikkaniemi et al. | |
| 7,747,966 B2 | 6/2010 | Leukart et al. | |
| 2002/0016729 A1 | 2/2002 | Breitenbach et al. | |
| 2002/0063732 A1 | 5/2002 | Mansikkaniemi et al. | |
| 2002/0065109 A1 | 5/2002 | Mansikkaniemi et al. | |
| 2002/0065881 A1 | 5/2002 | Mansikkaniemi et al. | |
| 2002/0120498 A1 | 8/2002 | Gordon et al. | |
| 2002/0154178 A1 | 10/2002 | Barnett et al. | |
| 2003/0014296 A1 | 1/2003 | Meine | |
| 2003/0023463 A1 | 1/2003 | Dombroski | |
| 2003/0177190 A1 | 9/2003 | Moody et al. | |
| 2004/0073615 A1 | 4/2004 | Darling | |
| 2004/0119760 A1 * | 6/2004 | Grossman et al. | 345/854 |

(Continued)

FOREIGN PATENT DOCUMENTS
KR 10-2005-0055657 6/2005

OTHER PUBLICATIONS

WO 2009-079609 International Search Report of PCT/US2008/087293 published Jun. 25, 2009.

*Primary Examiner* — Joseph Avellino
*Assistant Examiner* — Aftab Nasir Khan
(74) *Attorney, Agent, or Firm* — Andrew Bodendorf (57) ABSTRACT

An integrated web-based communications service provides a content aggregator to simplify the task of managing personal, friends, family, and business contacts via a process of aggregation and consolidation into a central point. The content aggregator imports contacts from existing databases, harvests additional contact information, and maintain the contact information.

23 Claims, 7 Drawing Sheets

U.S. PATENT DOCUMENTS

| | | |
|---|---|---|
| 2005/0005249 A1 | 1/2005 | Hill et al. |
| 2005/0015710 A1 | 1/2005 | Williams |
| 2006/0048059 A1 | 3/2006 | Etkin |
| 2006/0195472 A1* | 8/2006 | Cadiz et al. ................. 707/104.1 |
| 2006/0195474 A1* | 8/2006 | Cadiz et al. ................. 707/104.1 |
| 2006/0229941 A1 | 10/2006 | Gupta |
| 2006/0282319 A1 | 12/2006 | Maggio |
| 2006/2087919 | 12/2006 | Rubens et al. |
| 2007/0064920 A1* | 3/2007 | Ruckart ................... 379/355.07 |
| 2007/0130221 A1 | 6/2007 | Abdo et al. |
| 2007/0136430 A1 | 6/2007 | Qureshi et al. |
| 2007/0162328 A1 | 7/2007 | Reich |
| 2007/0250645 A1* | 10/2007 | Meadows et al. ............. 709/248 |
| 2008/0010297 A1* | 1/2008 | Goldfarb et al. ................. 707/10 |
| 2008/0033797 A1 | 2/2008 | Chickering et al. |
| 2008/0052162 A1 | 2/2008 | Wood |
| 2008/0059297 A1 | 3/2008 | Vallier et al. |
| 2008/0114737 A1 | 5/2008 | Neely et al. |
| 2008/0115088 A1 | 5/2008 | Frankel et al. |
| 2008/0133677 A1* | 6/2008 | Pattabhiraman et al. ..... 709/206 |
| 2008/0141145 A1 | 6/2008 | Klausmeier |
| 2008/0155547 A1 | 6/2008 | Weber et al. |
| 2008/0162260 A1 | 7/2008 | Rohan et al. |
| 2008/0222127 A1* | 9/2008 | Bergin ............................. 707/5 |
| 2008/0235078 A1 | 9/2008 | Hong et al. |
| 2008/0244425 A1 | 10/2008 | Kikin-Gil et al. |
| 2008/0244666 A1 | 10/2008 | Moon et al. |
| 2009/0037806 A1 | 2/2009 | Yang et al. |
| 2009/0063578 A1 | 3/2009 | D'Angelo et al. |
| 2009/0094093 A1 | 4/2009 | Phan |
| 2009/0100347 A1 | 4/2009 | Schemers et al. |
| 2009/0150489 A1 | 6/2009 | Davis et al. |
| 2009/0152349 A1 | 6/2009 | Bonev et al. |
| 2009/0157513 A1 | 6/2009 | Bonev et al. |
| 2009/0157658 A1 | 6/2009 | Bonev et al. |
| 2009/0157693 A1 | 6/2009 | Palahnuk |
| 2009/0158173 A1 | 6/2009 | Palahnuk et al. |
| 2009/0158186 A1 | 6/2009 | Bonev et al. |
| 2009/0158200 A1* | 6/2009 | Palahnuk et al. ............. 715/781 |
| 2009/0216569 A1 | 8/2009 | Bonev et al. |
| 2009/0313299 A1 | 12/2009 | Bonev et al. |
| 2010/0198684 A1 | 8/2010 | Eraker et al. |

* cited by examiner

Hi Jennifer,

Great news for Joseph! He's just signed up for Hub™, and it's working to make sure his email goes from being a pain to a pleasure!

Please help Joseph get your most updated information:

Home email:    Jennifer@cheaphost.com
Home Phone:   818.567.1234
Work email:    ▭
Work Phone:   ▭
☑ I work a 9 to 5 Monday through Friday job.
Cell phone:    ▭
☑ I use TEXT messages on my cell phone.

Address:    503 Aniston Place, Apt 43
City:       Salsbury    State/Province: WI
Zip/Postal Code: 91234   Country: USA Do you have a work address?

Thanks!

CONTACT AGGREGATOR

CROSS-REFERENCE TO RELATED APPLICATIONS

This application claims the benefit under 35 U.S.C. §119(e) of U.S. Provisional Application No. 61/014,422, titled "Communications System" filed on Dec. 17, 2007 in the U.S. Patent and Trademark Office and U.S. Provisional Application No. 61/051,339, titled "Dynamic Communications, Data, and Marketing System" filed on May 7, 2008 in the U.S. Patent and Trademark Office, both of which are herein incorporated by reference in their entirety for all purposes.

TECHNICAL FIELD

The following description relates generally to web-based contact management, and in particular to a contact aggregator to automatically gather, organize, and maintain user contact information.

BACKGROUND

A recent poll reveals the average computer user has four different email addresses—which is just one indication that users have too many sources of incoming communications to competently maintain. In addition, conventional systems place the burden of electronic communications squarely on the shoulders of the user. Users also are presented with many different types of communications devices. Many users are simply overwhelmed by the numbers and choices of functions of these devices and software such that many of the functions provided go unused, and to make matters worse, communications and conversation topics often jump between a variety of mediums including voice mails, text messages, faxes, and conversations. Therefore, an improved communications system is needed to aid, and organize communications between users.

This same situation also applies to personal organization. Most people have a large amount of information associated with each of these various types of communications. In particular, a user may have several address books, spread across various software applications/services (e.g., Outlook, Hotmail, Yahoo) and devices, such as their cell-phone or personal data assistant (PDA) of which varies entries at any time are not up-to-date and/or incorrect. The user also may have various types of contact information associated with different groups of individuals, such as work, family, and friends that are stored in many different locations. Maintaining all of these contacts is impractical and time-consuming and in many cases simply does not happen. Therefore, an improved organizational system is needed to simplify, aid, and organize this information.

SUMMARY

In one general aspect, information for a contact in a database system may be automatically maintained by determining the contact has not received an email; determining information associated with the contact stored in the database; generating a webpage requesting contact information or confirmation of contact information; and sending an email to the contact with a link to the generated webpage. The email may be addressed to two or more email addresses stored in the database that are associated with the contact.

Information provided through the generated webpage may be received, and contact information in the database system may be updated with the received information.

The webpage may be monitored for information provided from the contact. After a predetermined period of time has expired, a user may be informed about the failed request to obtain the contact information. In addition, it may be determined whether the database stores a phone number associated with the contact and an automated phone system may be activated to dial the phone number and request the information. The automated phone system also may provide the link to the webpage. The email may be determined as not being received if the email has been returned or indicated as undeliverable.

In another general aspect, contact information for a contact database system may be automatically imported by providing an automated online questionnaire to a user; receiving contact information in response to the questionnaire; determining one or more online accounts associated with the user from the received contact information; automatically accessing the one or more online accounts using the received contact information; importing contact information stored by the online accounts; merging the imported contact information and the received contact information; and storing the merged contact information in the database. Merging may include removing duplicate information or contacts.

The merged contact information may be stored by populating a number of predetermined data fields for each contact. If one or more fields for a contact is missing information or empty a webpage may be generated requesting the contact information associated with the one or more fields be provided by the contact, and an email may be sent to the contact with a link to access the generated webpage. The email may be addressed to two or more email addresses that are associated with the contact.

Information provided through the generated webpage may be received, and the one or more fields in the database system may be updated with the received information.

The webpage may be monitored for information provided from the contact. If a predetermined period of time has expired, a user may be informed about the failed request to obtain the contact information.

In yet another general aspect, information for a contact in a database system may be automatically maintained by storing one or more greeting events for a contact in the data base system; determining an occurrence of a greeting event; automatically generating an email in response to the occurrence including contact information and a request for verification; receiving a response from the contact; and automatically updating the contact information in the database with response.

Other features will be apparent from the detailed description, drawings, and claims.

DETAILED DESCRIPTION

The following describes a communications system that provides an integrated web-based communications and utilizes a variety of WEB-accessible mobile devices, computers, and other consumer electronic devices in conjunction with a server architecture to simplify all of a user's daily communications and contact organization. According to various aspects described herein, the task of managing and organizing personal, family, friends, and business contacts is simplified.

The system logic is based on utilizing networked, online, or web-based processing devices, such as servers, as the central processing and database engine for content management and communications. As the system is device and source agnostic, the system is designed to work with any web-accessible device. As a result, the user devices may be nothing more than a communications portal to collect information from and present content to the user.

The system provides a number of services to facilitate user communications and data management including contact importing, harvesting, and maintenance. These and many other aspects of the system are described in further detail below.

Figure 1:
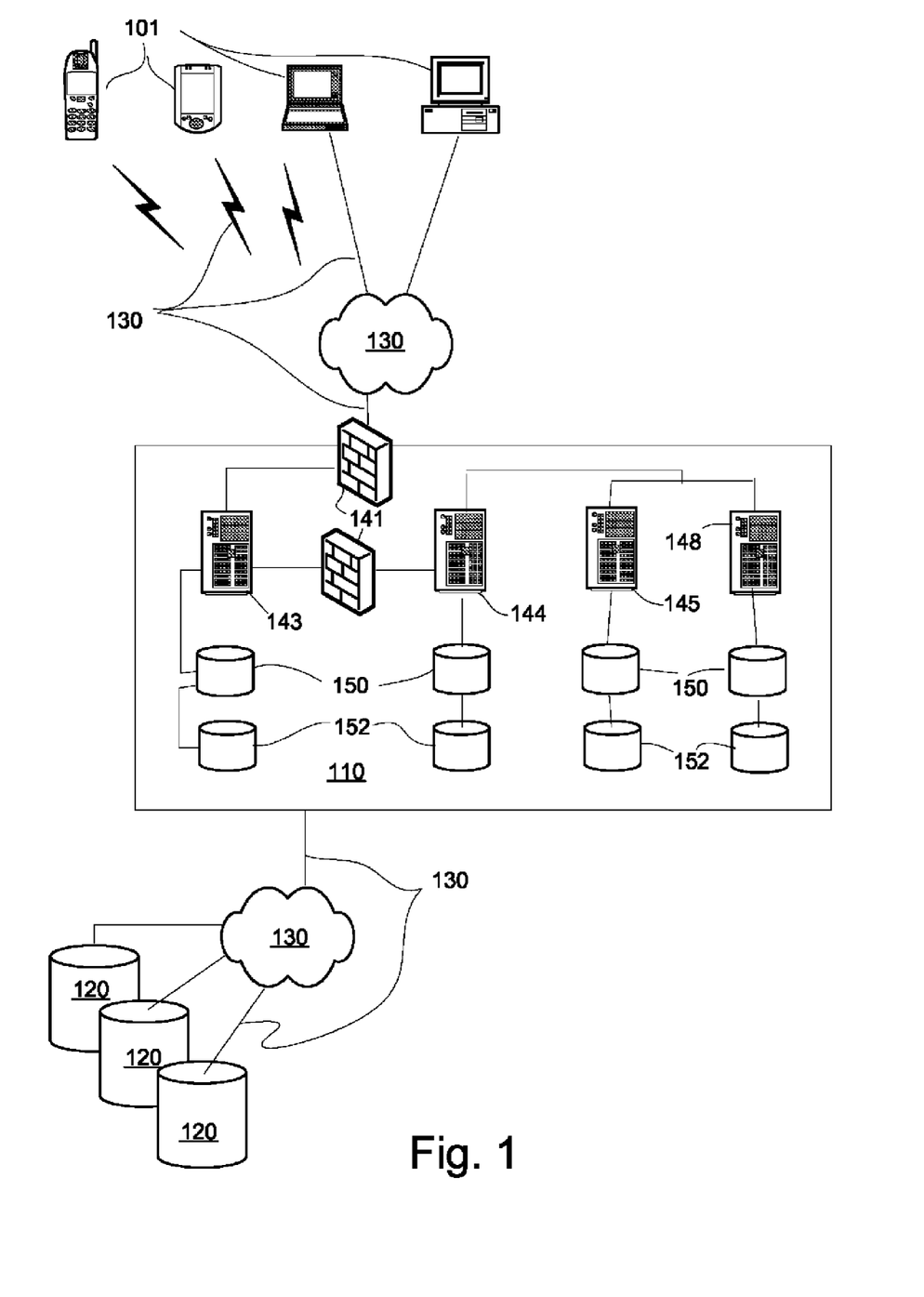
FIG. 1 shows one exemplary block diagram of a communications system.

FIG. 1 shows one block diagram of an exemplary communications system 100. The communications system 100 includes one or more user devices 101, a service provider system 110, other Internet Service Providers and websites 120, and various communication paths 130. As the communications system 100 is device and source agnostic, the communications system 100 is designed to work with any web-accessible user device, as explained in further detail below.

The user device 101 may be any type of electronic device that presents content received from the service provider system to the user. For example, the user device 101 may be a consumer electronics device, a mobile phone, a smart phone, a personal data assistant, a digital tablet/pad computer, a hand held/mobile computer, a personal computer, a notebook computer, a work station, a vehicle computer, a game system, a set-top-box, or any other device that can implement a user interface and/or browser to communicate with and present content from the service provider system 110.

The user device 101 may include a processing device, one or more storage devices, and one or more communications interfaces. A user device 101 also may include additional elements, such as, for example, one or more displays or screens, one or more speakers, one or more user input devices, and a microphone. A user device 101 also may include one or more associated peripheral devices, such as, for example, a display, a memory, a printer, an input device, an output device, and speakers.

The processing device may be implemented using any general-purpose or special purpose computer, such as, for example, a processor, a digital signal processor, a microcomputer, a field programmable array, a programmable logic unit, a microprocessor or any other device capable of responding to and executing instructions in a defined manner. The processing device may run one or more software applications that communicate with the service provider system 110 and present content received from the server provider system 110 to the user. The processing device also may access, store, manipulate, process, and create data in response to the applications. The software applications may include a computer program, a piece of code, an instruction, or some combination thereof, for independently or collectively instructing the processing device to operate as desired. Examples of software applications include: a browser, a mini browser, or other programs that interact with a front end interface application (FEIA) provided by the service provider system 110 to provide content, a login/signup, a user interface, and email among other features. Other examples of applications, include a mobile front end interface applications (e.g., for a cell or a smart phone) that allow the user device to communicate with the system service provider 110.

The applications, content, and data may be embodied permanently or temporarily in any type of machine, component, physical or virtual equipment, storage medium or device, or propagated signal wave capable of providing instructions or data to or being interpreted by the processing device. In particular, the applications or data may be stored by a storage medium or a memory including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented. The memory may be removable, such as, for example, a card, a stick, or a disk that is inserted in or removed from the unit.

The communications interface may exchange data and content with the service provider system 110 using various communications paths 130. The interface allows the processing device to send and receive information using the communications paths 130. The communications interface may be implemented as part of the processing device or separately to allow the processing device to communicate using the communications paths 130. The interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service provider system 110 via a communications path 130.

The communications paths 130 may be configured to send and receive signals (e.g., electrical, electromagnetic, or optical) that convey or carry data streams representing various types of analog and/or digital data including content for presentation to a user. For example, the communications paths 130 may be implemented using various communications media and one or more networks comprising one or more network devices (e.g., network interface cards, servers, routers, switches, hubs, bridges, repeaters, blades, processors, and storage devices). The one or more networks may include a local area network (LAN), a wide area network (WAN), a global area network (GAN), a plain old telephone service (POTS) network, a digital subscriber line (DSL) network, an integrated services digital network (ISDN), a synchronous optical network (SONNET), Passive and Active Optical Networks (PON or AON), or a combination of two or more of these networks. In addition, the communications paths 130 may include one or more wireless links (e.g., microwave, radio, and satellite) that transmit and receive electromagnetic signals, such as, for example, radio frequency, infrared, and microwave signals, to convey information/data signal. In one example, a communications path 130 may include the Internet or World Wide Web.

The service provider system 110 facilitates communication by, organization of, and presentation of content to users. The service provider system 110 also stores and manages user associated information in a centralized location. In particular, the service provider system 110 implements a user interface to aggregate, consolidate, organize, and simplify a user's daily communications, such as email and instant messaging into a central point for one-stop organization, data, and content management.

The service provider system 110 includes one or more communications devices, processors, memories/storage devices, communications interfaces, network devices, and communications paths to store, process, manipulate, organize, consolidate, maintain, and present content and data for a user. In the example shown in FIG. 1, the service provider system 110 may include a one or more security devices 141 (e.g., firewalls), web servers 142, an application server 144, an SQL server 145 and a mirror SQL server 148, and associated memory 150 and backup memory devices 152. It is understood, however, that the example given in FIG. 1 is for illustrative purposes only, and that different configurations, combinations of devices, and numbers of devices may be provided for any particular service provider system 110.

In one example, the web server 143 may be implemented using a Dell PowerEdge 1900 2-Socket, Quad-Core Tower Server with a Red Hat Enterprise Linux 5 operating system using an apache HTTP server programming language to provide JavaServer Pages (JSP). The web server 143 may run a FEIA to aid in login, signup, and creation of a user account, and receive information from the first time wizard. The application server 144 may be implemented using a Dell PowerEdge 1900 2-Socket, Quad-Core Tower Server with a Red Hat Enterprise Linux 5 operating system using programming languages YoLinux Java, Eclipse C/C++ IDE. The application server 144 may run a contact importer, a harvester, and a maintainer. The SQL Server 145 may be implemented using a Dell PowerEdge 1900 2-Socket, Quad-Core Tower Server with a Red Hat Enterprise Linux 5 operating system using an Oracle Database 11g Enterprise Edition for Linux (or equivalent) to maintain various databases, such as, for example, a contact database (DB). The mirror SQL 148 server mirrors the SQL Server 145. The contact DB keeps track of every user's contact information. The contact information includes various email addresses, avatar images, phone numbers, birthday info, etc.

In order to interact with the service provider system 110, a user needs to establish an account. The user must activate the account from a user device 101 running an application allowing the user device 101 to communicate with the service provider system 110, such as a browser. A browser may include any application that communicates with a web server primarily using hypertext transfer protocols HTTP (e.g., HTTP/1.1) to fetch content or provide a portal to service provided by the service provider system 110. HTTP allows the browser to submit information to servers in addition to fetching content from them. Content may be located by the browser using a uniform resource locator (URL) as an address. Many browsers also support a variety of other URL types and their corresponding protocols, such as Gopher (a hierarchical hyperlinking protocol), file transfer protocol (FTP), real-time streaming protocol (RTSP), and an SSL encrypted version of HTTP (HTTPS). Content may be provided in a hyper-text markup language (HTML) that is identified using a MIME content type. Most browsers natively support a variety of formats in addition to HTML, such as the JPEG, PNG, and GIF image formats, and can be extended to support more through the use of plugins and/or scripts. The combination of HTTP content type and URL protocol specification allows images, animations, video, sound, and streaming media to be embedded in the content.

Figure 2:
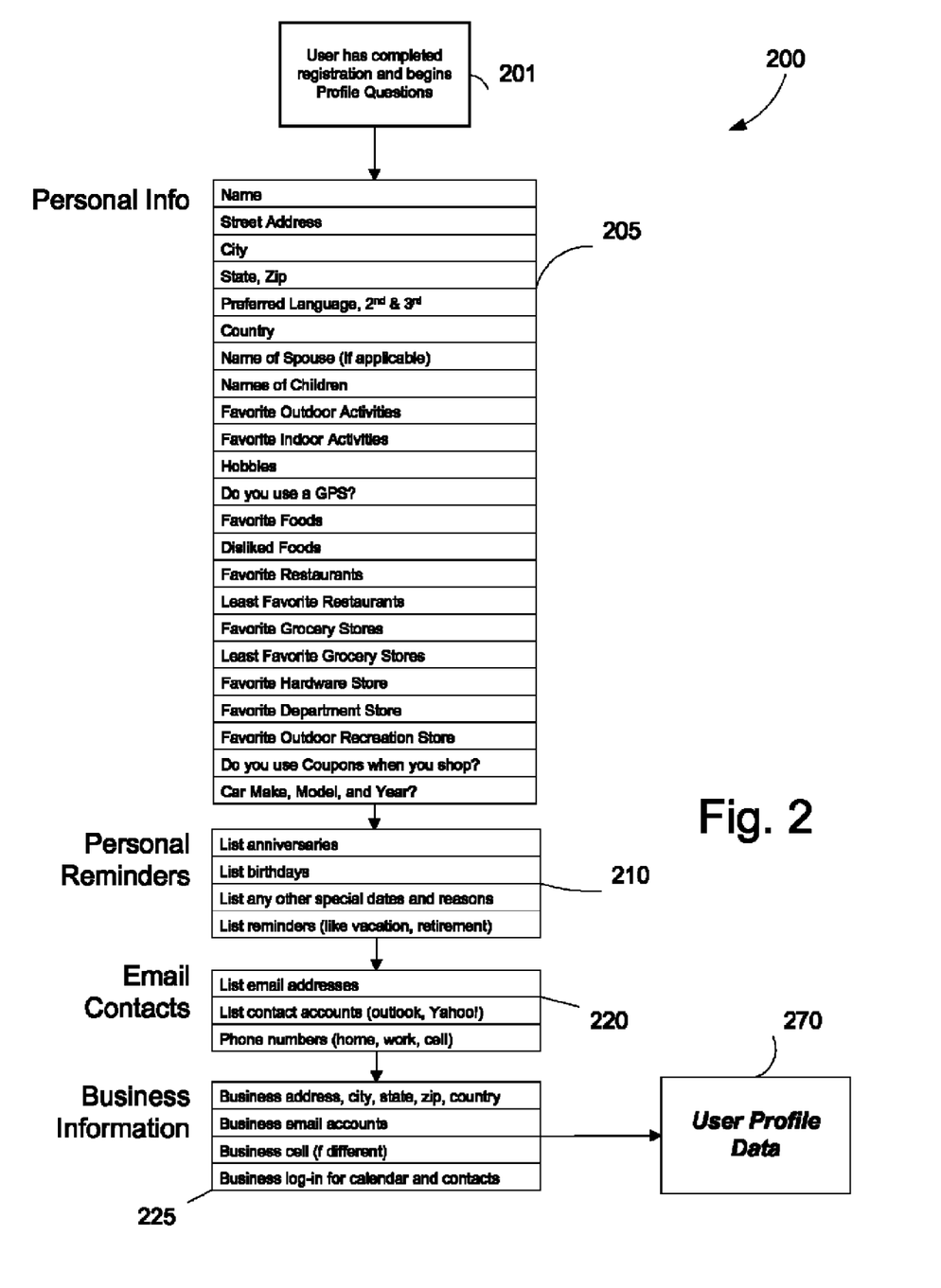
FIG. 2 is an exemplary process for a user profile questionnaire.

The browser may include coding that interacts with the FEIA. The initial code that is run in the browser may be downloaded from the service provider system 110 (e.g., with purchase of an account) or retrieved from a storage medium (e.g., a CD promotional gift). The browser running on the client device 101 connects with the FEIA application run by the service provider system 110 web server 143 to initiate login, account activation, and provide a first-time questionnaire. During the initial account setup, the user may create a password and/or user identification (ID). In addition, the service provider system 110 may configure settings and data on the user device 101 (e.g., set cookies). The service provider system 110 also provides the user with a user profile questionnaire. FIG. 2 illustrates an example 200 of how the service provider system 10 conducts the initial user profile questionnaire.

As shown in FIG. 2, when the user login is first initiated 201, the service provider system 110 asks the user several questions to help tailor the content and services that are delivered to the user. After the initial questionnaire is completed, an edit function provided by the user interface allows the user to update their profile information at any time. After the user completes their initial registration, the user then responds to the questionnaire provided by the user interface, which may be updated or changed at any time. The questionnaire may be provided in any number of formats that allow a user to provide information to the service provider system 110. For example, the questionnaire may be a webpage that includes content, such as a series, list, or groups of questions for the user to answer. Various windows, fields, boxes, lists, or drop down menus may be provided to solicit and receive information from a user. Some examples of questions asked or information requested may include personal information 205, personal reminders 210, email contacts 220, and business information 225.

Examples of the personal information 205 may include: a user name, a zip code, a name of spouse, and the names of children. The user also may provide their address/contact data or the system can automatically provide address data.

The service provider system 110 also collects information about personal reminders 210 so the service provider system 110 may remind the user of important dates, such as, anniversaries; birthdays (e.g., spouse, kids, relatives, and friends); an unlimited number of special dates and names of those events; and reminders (e.g., such as vacation, appointments, activities, or retirement). The personal reminders may be used as a source of greeting events, as explained in further detail below.

The user also is prompted to input email addresses 220 (e.g., family, friends, business contact, and relatives, among other important contacts). The user is asked to input their user names/aliases/IDs/account numbers and passwords for any online accounts, such as Yahoo!, Google, MySpace, kut, Hi5, Facebook, Friendster, Linked In, XING and Twitter. The user also is asked for any other important contact information, such as phone numbers (e.g., work, cell, and home).

Business Information 225 also may be collected by the service provider system 110, such as business zip, business email account(s), business cell phone (if different), business log-in (user name and password) for contacts and calendar.

Once this information is collected, the information is stored in the user profile database 270.

Figure 3:
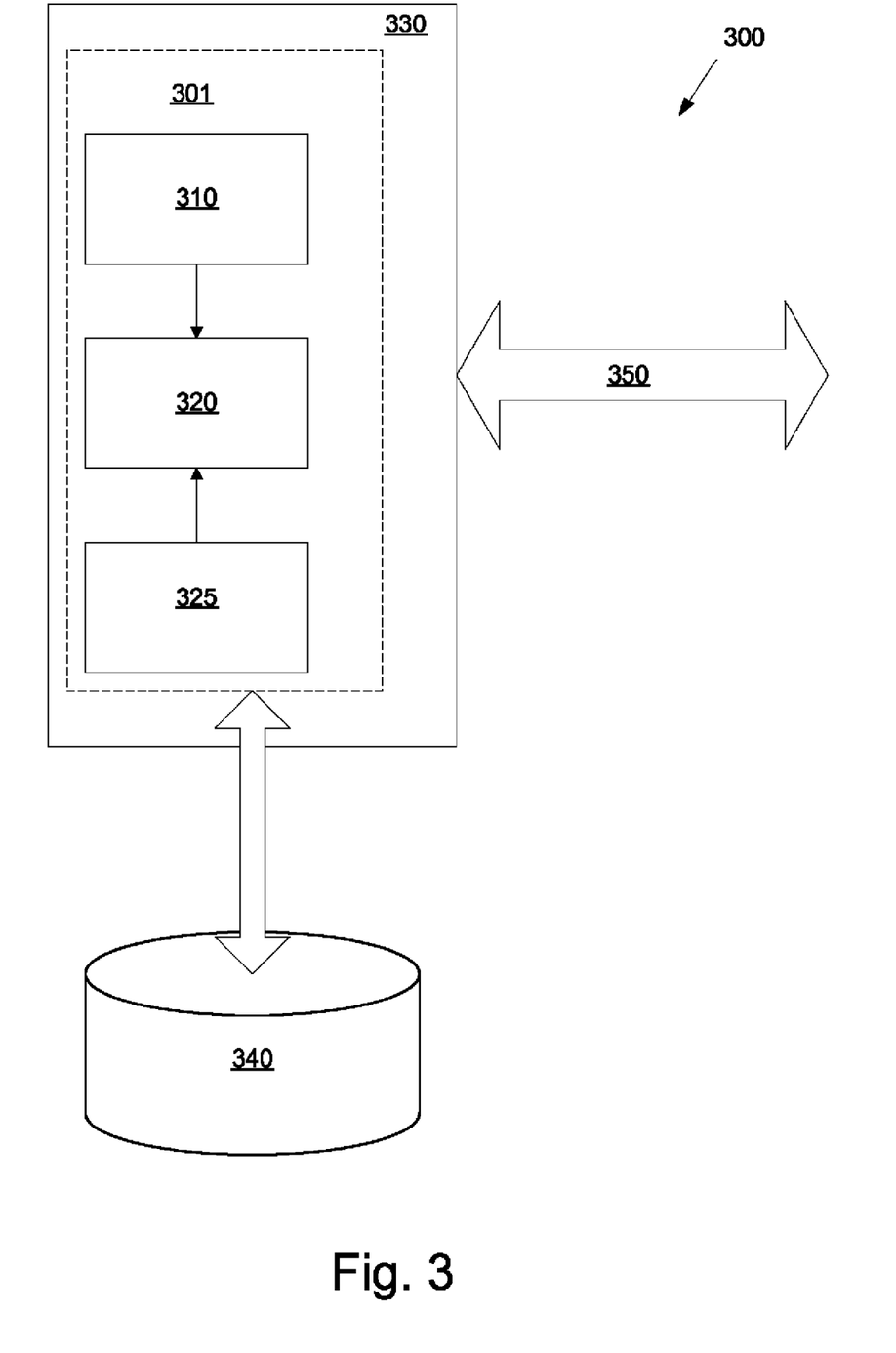
FIG. 3 is an exemplary block diagram of a contact aggregator system.

As shown in FIG. 3, the service provider system 110 works to collect, harvest, organize, and maintain contact information through the use of a contact aggregator system 300. The contact aggregator system includes a content aggregator 301. The content aggregator includes a suite of software/applications including a contact importer 310, a contact harvester 320, and contact maintainer 325 run by one or more servers 330 of the service provider system 110 that runs applications in conjunction with maintaining the client contact DB and a one or more storage devices 340. In one example, the server 330 may be implemented using the applications server 144 and associated hard disk 150 and shadow storage 152. The server 330 communicates with the rest of the service provider system 110 through communications path 350 (e.g., a communications path 130 secure link to the web server 143 and the SQL server 145).

The contact importer 310 imports contacts from various user client devices 101 and any other accounts, software, and systems associated with the user that store user contact information. The contact importer 310 also uses various user accounts information, such as the user names, the IDs, the aliases, and the passwords gathered during the initial account set up to masquerade as the user and download the user's contact information associated with or stored by any portal and/or social networking websites that user might belong to.

Using the passwords provided by the user during account setup, the contact maintainer 310 implements an automated process to login as the user on all supported address book/contact storage accounts, such as Yahoo!, Google mail, and Outlook. Any contacts that are identified from these accounts are imported into a temporary database. All imported contacts are compared against each other, and, if possible, the data is merged, the duplicates are deleted, and a final list of contacts and their associated information is created and placed in the user contact DB, which stores all of the user contacts.

For each contact associated with a user's account stored in contact DB, the contact DB may include a number of datafields to store information regarding the contact. For example, the data fields may include a contact name, one or more email addresses, a fax number, one or more mobile phone numbers, a voice phone number, a business phone number, a home number, a home address, a business address, and various IM ID's. The contact importer 310 also captures any user avatar images when available. During the automated import process, the contact importer 310 merges the data collected from various sources and eliminates any duplicate information. For each contact the importer finds in one the user's existing contact formats, the contact importer attempts to populate as many the fields provided by the contact DB as possible with the information available from the importation process. Any contacts that are missing information may be provided to the contact harvester 320 in an attempt to retrieve the missing information. The contact importer then writes this information stored in a temporary database to the Contact DB.

The contact harvester 320 is an application that is used to retrieve, supplement, and/or update contact information that may be incomplete, out of date, or in error. The service provider system 110 examines the contact DB after initial setup and periodically thereafter. As part of the examination, the service provider system 110 provides the contact harvester 320 with contacts that have information fields that are missing information, are incomplete, or may be suspected of being incorrect or out of date. The contact harvester 320 spawns a web page for such contacts to solicit missing or information in need of updating. The web page may be hosted by the web server 143. The web page may be populated with all or a portion of the existing information for the contact stored in the contact DB. In addition, information associated with one or more fields that are blank, incomplete, or missing may be requested or solicited. The web page may include window, boxes, fields, menus that may be used by a contact to provide the missing information in conjunction with a browser. The contact harvester 320 generates an email that is sent to the contact at one or more of the email addresses stored for the contact in the contact DB. The email contains a link to this spawned webpage which may then be filled out by the user. To assure the contact being solicited of the authenticity of the web page and the email with the link to the webpage, a personal message from the user may be included or other information known to the contact may be provided. For example, a photo or avatar of the user and/or a portion of the user's personal information may be included with the message and/or website.

The contact harvester 320 also may interface with a telephony based, or web-telephony based device with voice prompts and voice recognition capability. As a result, the contact harvester 320 may get in touch with a contact at a provided phone number and use automated voice recognition technology and/or automated menus to request the missing contact information directly from the contact. This is especially helpful for tracking down contact information for contacts without valid email addresses. The automated voice system translates answers from the contact into digital data that is stored in the contact DB. The contact harvester 320 may then provide a spawned website and email to the contact to verify the information received by the automated voice system. The contact harvester 320 provides a report to the user if the contact harvester 320 is unable to contact a user and/or determine missing information.

When the service provider system 110 spawns a custom website for a contact to fill out their contact information, all known contact information may be filled out in the spawned form. The contact is then asked to fill in any missing info or update and change information that may be incorrect. Certain items or fields having missing or incomplete information that can be looked up with high accuracy may are filled in automatically by contact harvester 320. For example, if the contact information contains an address with the word "Calgary" in the city field, the contact harvester safely fills in the State/Province field with "Alberta" and the country field with "Canada." If the contact includes an address field of "503 Aniston Place, Apt 43," a city field of "Salisbury," and a State/Province field of "Wis.," the contact harvester safely fills in the Zip Code/Postal Code field with 91234 and the country field with "USA." A sample spawned webpage which may be used by a contact to fill in missing information is shown in FIG. 4.

Figure 4:
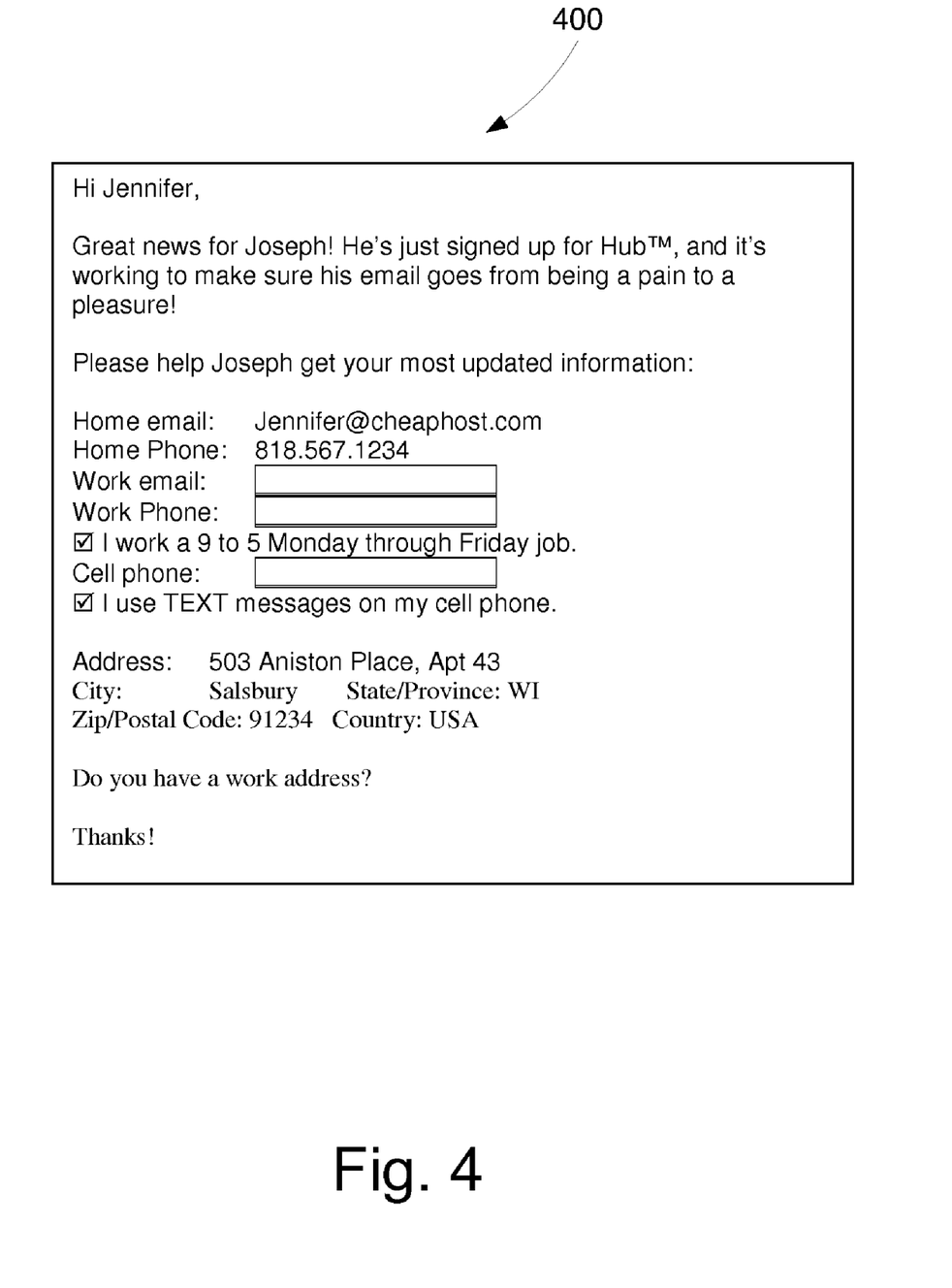
FIG. 4 is an exemplary contact fill-in form.

As shown in FIG. 4, the webpage 400 may include a personal greeting 401 and a listing of the contact data stored in the contact DB for the contact. Missing elements may include an entry field 410 for the contact to supply the missing information through use of a user input device. Check box 420 may be provided to toggle features on and off. In addition, there may be a solicitation for additional information 430 which can spawn additional web pages to supply the requested information. In addition, the webpage may include a verification 440 for the existing information. No response or a yes indication does not trigger any change; however a negative indication may spawn an additional webpage to correct and/or supplement the contact information displayed. Alternatively, the user may be able to change the information directly in the webpage by using a user input device and selecting the user information to change and change the information.

The contact maintainer 325 is an application that helps to maintain the integrity of contact information stored in the contact DB. For example, the contact maintainer 324 keeps track of failed email deliveries associated with the user account. If the contact maintainer 325 suspects that a contact has changed their email address (thereby accounting for the failed email deliveries), the contact maintainer 325 provides the information contact to the contact harvester 320. The contact harvester 320 may then generate a spawned webpage and/or use the automated phone system to determine correct contact information and/or update the contact information in the contact DB.

The contact maintainer 325 also scans or reviews user emails to detect key words and/or phrases, such as "my new phone number is," "we're moving," and "my new address is." If such key words, phrases, or combinations of key words are detected, the contact maintainer 325 parses the text to determine if the email is a change of address/email/phone message or is otherwise updating/change information associated with contact. If the contact maintainer 325 determines with a predetermined level of confidence that the email does contain such information, the contact maintainer prompts the user with a message, for example, like this:

"Hi, we think that Cynthia Alvarez might be changing her phone number from 310.234.1234 to 818.334.4456. Select here to make this change, or select here to read the email."

The user may then select to update the user information or make further inspection of the information to determine if the contact information should be updated. The message may be provided in any number of formats including email, instant messages, or directly through a user interface of the user device 101.

As described above, the service provider system 110 also gathers personal reminder information for users, such as contact birthdays. The contact maintainer 324 uses the personal reminder information as greeting events to automatically send greetings to contacts. Examples of greeting events include birthdays, anniversaries, and holidays, among others. The contact maintainer 325 uses the greeting event as an opportunity to periodically contact all members of the contact list. When the contact maintainer 325 determines the occurrence of a greeting event, the contact maintainer 325 sends a greeting to one or more contacts, such as "Happy New Year!" The greeting may be an email or instant message. The greeting may include a question for the contact, such as "Do you have new contact info?" If the user responds in the affirmative, the contact harvester 320 may spawn a webpage for the contact to review their stored contact information and update/change information as necessary. As a result, the greeting provides an opportunity to the contact to update their contact information and for the service provider system 110 to spread this information. More importantly, the contact maintenance is done without any additional effort or input required by the user.

Figure 5:
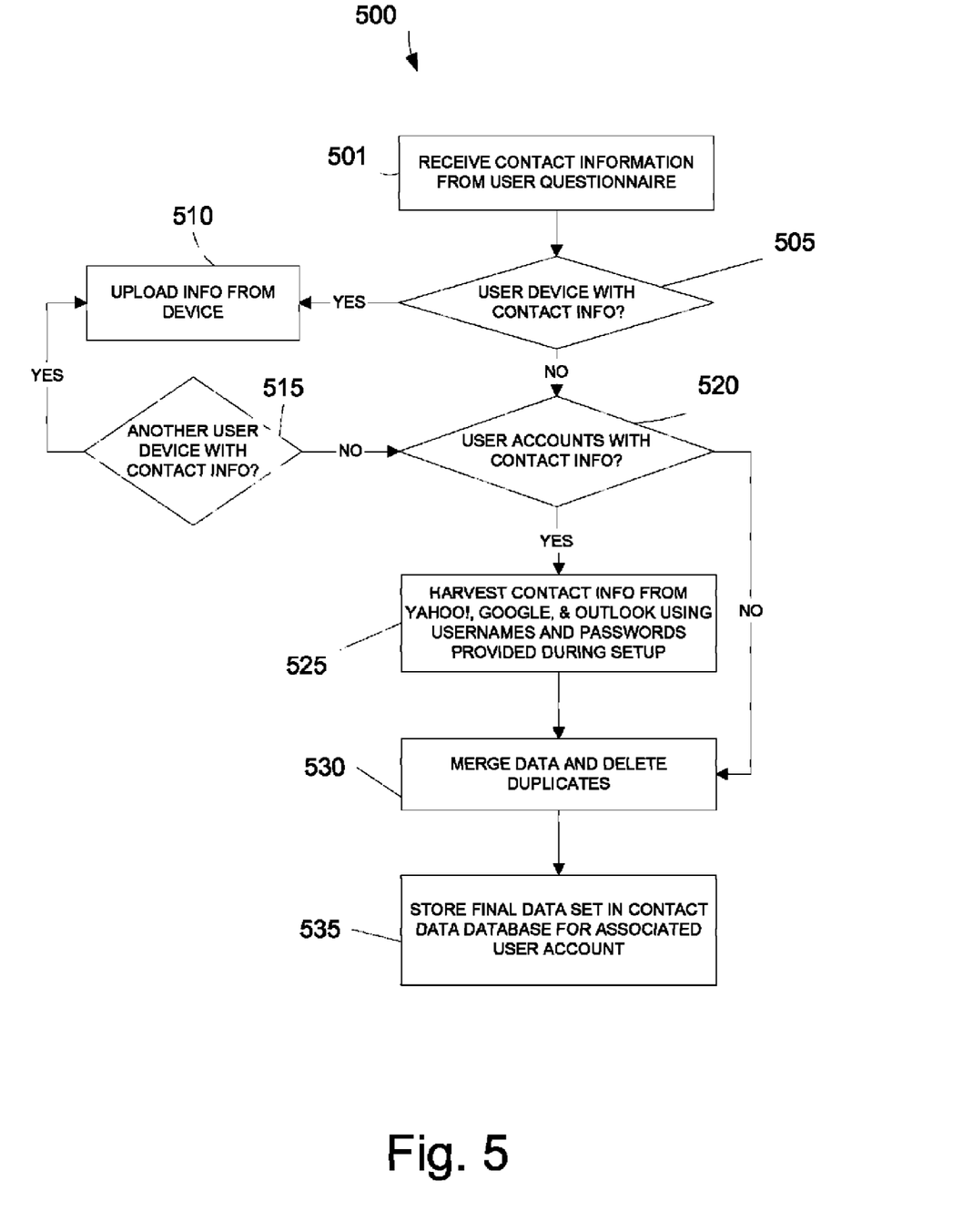
FIG. 5 is an exemplary process for contact importation.

FIG. 5 is an exemplary process 500 for importation of contacts by the contact importer 310. The contact importer 310 receives the contact information from the questionnaire that is temporarily stored during the initial login process 501. The service provider system 110 also determines whether there are any user devices 101 that store contact information 505. If there is a user device 101, the service provider system 110 uploads the contact info from the device and also temporarily stores the information with the contact information from the questionnaire in a temporary database 510. The service provider system 110 determines if there any remaining user devices 101, 515 and if so, uploads information from each user device 101, 510. The contact information may be uploaded using a data importer application. The application may be universal or device specific depending on how the contact data is stored by the user device.

The service provider system 110 also determines whether the user has any other accounts that store contact information (e.g., Yahoo!, Google, Myspace, and Outlook) 520. If so, the contact maintainer 310 implements an automated process to establish a connection with each account by accessing a portal or other point of entry to the account provided by the online service provider, provides the required identification information (e.g., ID, user name, alias, account number, and password) to login to the account, accesses the contact information (e.g., in an address book), and imports the contact information into the temporary database 525. Once all contact information has been imported, the contacts are compared against each other in the temporary database and the data is merged 530. If any contacts or contact information is duplicated, the excess contact information is deleted and a final list of contacts is created and placed in the user contact DB which stores all of the user contacts 535.

Figure 6:
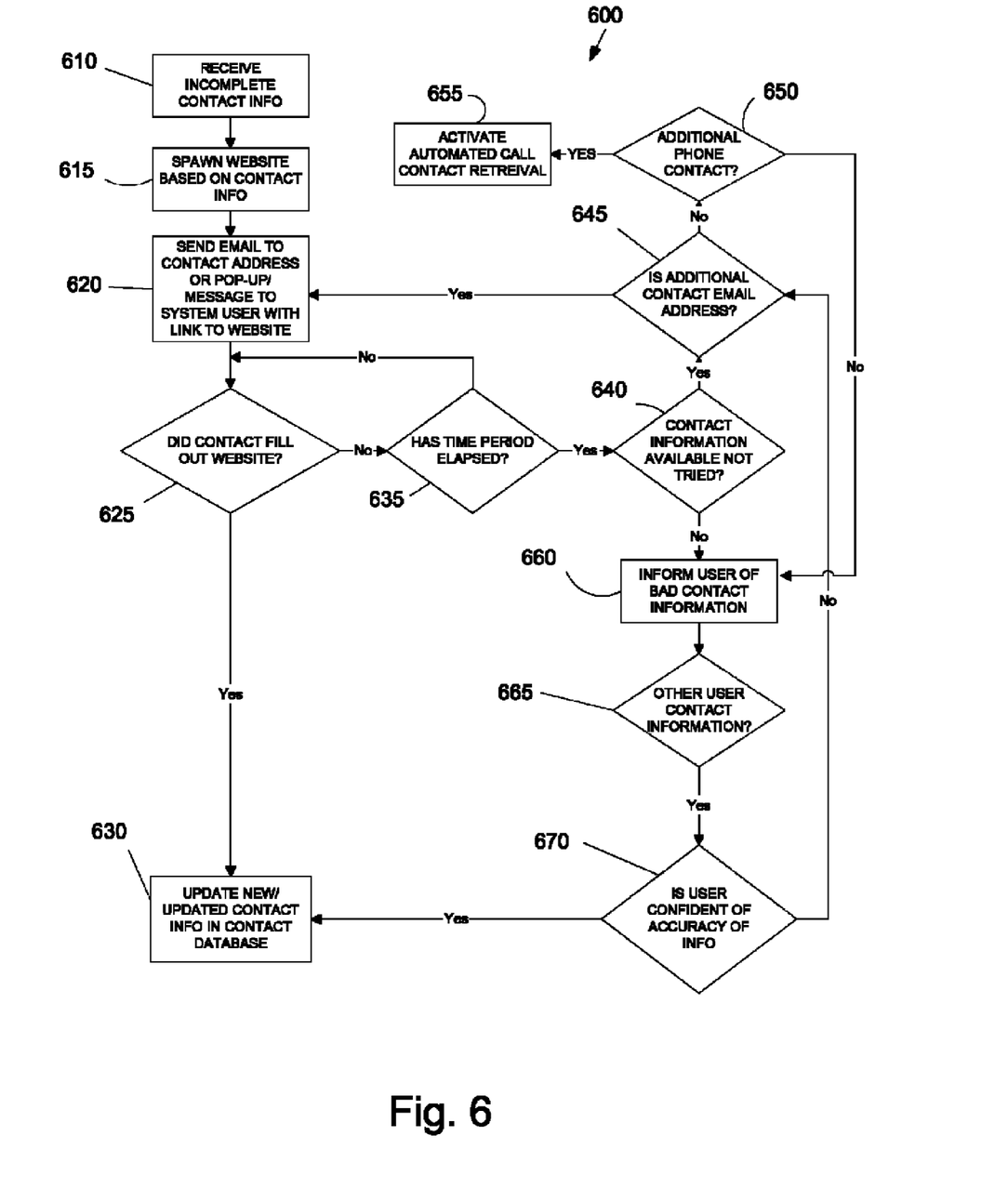
FIG. 6 is an exemplary process for contact harvesting.

FIG. 6 shows an exemplary process 600 for contact harvesting. The contact harvester 320 receives information associated with a contact missing information in the contact DB 610. Using the information, a website is spawned for the contact 615. The website may be a webpage provided by the web server 143. The webpage includes an identifier for the contact, information from one or more of the fields from the contact DB associated with the contact, information that may be missing from the contact DB, or any combination of this information.

An email also is generated and sent to non system users or a popup window is sent to system users 620. The email may include a link (e.g., a hyperlink) that may be selected by the contact using a user input device and browser. Once selected or activated, the link causes the browser to present the spawned webpage to the contact. The browser allows the contact to provide any requested or missing information to the service provider system 110. In addition, the contact can confirm (e.g., implicitly or explicitly) any of the information provided about the contact on the spawned webpage. If the information is incorrect, the contact may change the information.

The website is monitored to determine whether the contact has visited the website to provide any missing or updated information 625. If the contact has provided the requested, missing information and/or updates information, the contact DB is updated with the information provided 630. If the website has not been visited, it may be determined whether a predetermined period of time has elapsed (e.g., 3 days) 635. If not, the system continues to monitor the website 625.

If the predetermined period of time elapses 635, the service provider system 110 determines if there is any other contact information provided by which the service provider system 110 might attempt to contact the user 640. For example, the service provider system 110 may determine if there is an additional email address to try 645. If so, the system may send another email to the determined email address with the link to the spawned website 620. As an alternative, the initial email sent to the contact 620 may be addressed to all of the email addresses that are stored for the contact negating the need to determine or try alternative email addresses.

Once all email addresses have been tried, the service provider system 110 may determine if any phone numbers are provided for the contact 650. If so, the service provider system 110 may engage an automated call service to try each number to request the missing information or to inform the contact that the user has been trying to reach them and that their contact information may not be up to date 655. The automated phone or call service may include a voice-system with voice recognition and voice synthesis (e.g., a simple "say your choice" or "yes/no" menu system) that works with any persons voice, no training needed. If the automated call service receives a voicemail of the contact, a brief message may be left for the contact indicating that the user has been trying to reach them. In addition, the service may provide the voicemail with the link (e.g., a URL) to the website or service provider system 110 to update their information. In addition, the service may leave a contact number for the user. If the contact information is updated using the automated voice system, the user may be presented with an option to overrule or verify the contact information before the contact DB for the user is updated.

If no other contact information is attainable, the system provider system 110 may send a message or email to or otherwise notify the user that contact information associated with the contact may be bad or incomplete 660. Additionally, the user address book or contact directory may include a visual indication (such as a type face, a color, a size, or other marking) to alert the user that the contact information may be bad or incomplete to prevent the user from unknowingly continuing to use the suspect or bad contact information in their communications. As part of this process, the service provider system 110 may inquire if the user has any additional contact information for the contact 665. If the user does have additional contact information, the service provider system 110 may inquire as to the user's confidence level in the information 670. If the user's confidence is above a predetermined level, the contact DB may be updated with the contact information provided by the user 630. If the user's confidence level is below a predetermined level, the service provider system 110 may use the information to verify the contact information by sending an email with a link to the spawned website or by using the automated phone service.

If the user does not have any additional contact information, the service provider system 110 may give the user the option to delete the contact, continue to indicate the contact information as suspect, periodically remind the user of the suspect contact info, and/or inquire if new contact information has been acquired 680.

Figure 7:
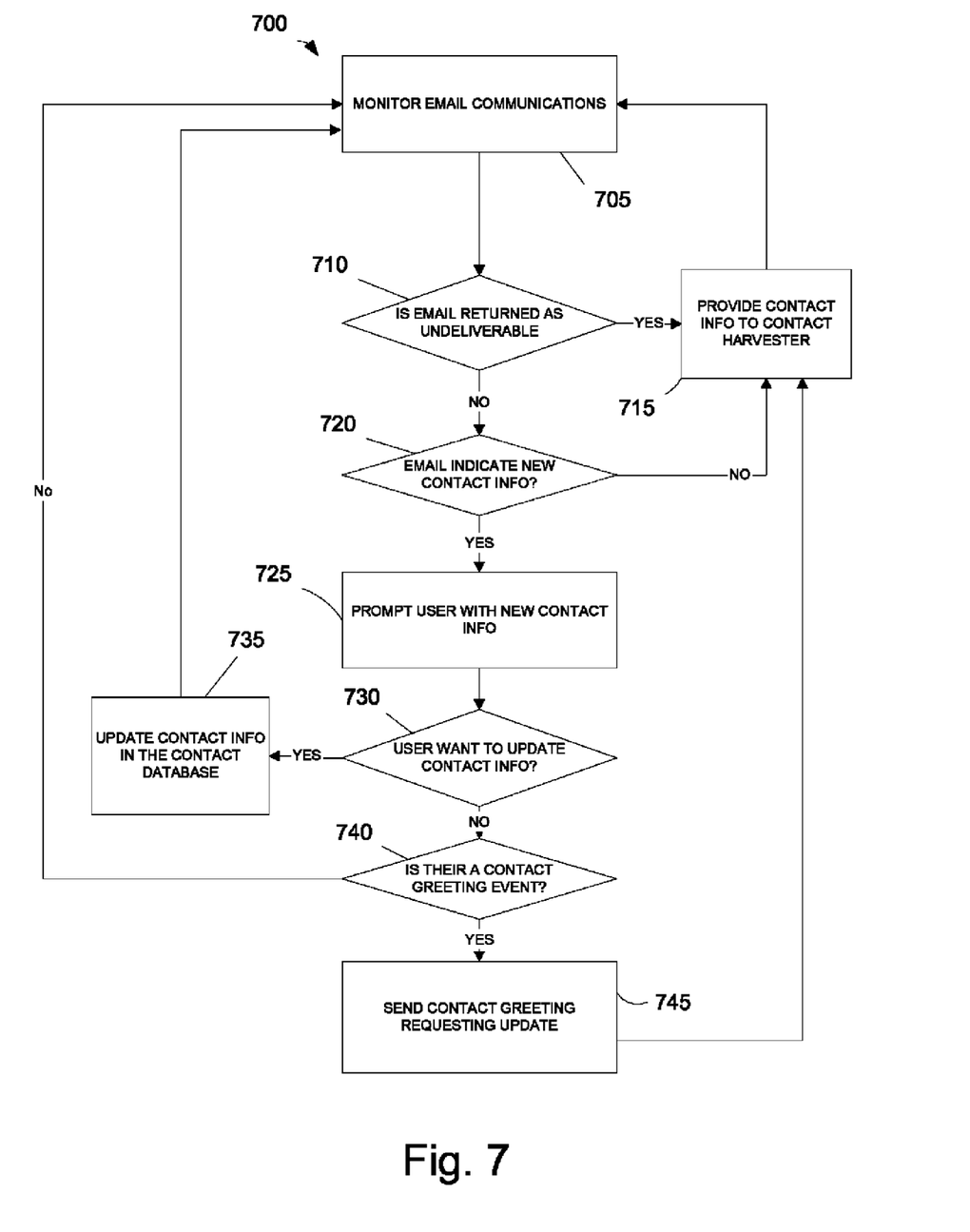
FIG. 7 is an exemplary process for contact maintenance.

FIG. 7 shows an exemplary process 700 for contact maintenance. The contact maintainer 335 may monitor email communications 705. It may be determined if the email is undeliverable 710. If email is returned as undeliverable 715, the contact may be provided to the contact harvester 320 to perform the harvesting process 600. It also may be determined if an email indicates new contact information 720. If the email indicates the contact has new information, the user may be prompted with a message indicating the service provider system 110 believes that one of there contacts has new contact information 725. The message may ask if the user wishes to update the contact with the new contact information 730. If so, the contact database is updated with the new contact information 735.

The service provider system 110 also may determine is there is a contact greeting event 740. If so, the system may generate a greeting event email or message (such as "Happy Birthday Fred") and include a request for updated contact information by invoking the contact harvester 320 to create a spawned website and email with link to the spawned website 745. Alternatively, the website may be spawned, and the link to the website may be included in the greeting event email.

As a result, all of the users contact information may be centrally located, managed, a kept up-to-date, by the content aggregator relieving the user of much of the responsibility and frustration for maintaining contact information that may be spread over many different locations and address books.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claim is:

1. A method of automatically maintaining contact information for a contact of a user stored in a database system, the method comprising:
   receiving an indication that an email was not delivered to the contact;
   determining the contact has not received an email based on the received indication;
   determining the contact information associated with the contact stored in the database;
   generating a webpage requesting contact information from the contact or confirmation of the determined contact information associated with the contact; and
   sending an email to the contact with a link to access the generated webpage; and
   monitoring access of the generated webpage to determine whether any information about the contact including the requested contact information or the confirmation of contact information associated with the contact is provided;
   receiving the information about the contact provided via the generated webpage and updating the contact information in the database system with the received information when it is determined that information about the contact is provided; and
   taking further action to resolve the contact information when it is determined that information about the contact has not been provided within a predetermined period of time.

2. The method of claim 1 wherein sending an email includes sending an email addressed to two or more email addresses stored in the database that are associated with the contact.

3. The method of claim 1, wherein
   taking further action includes informing the user that the request regarding contact information is unresolved.

4. The method of claim 1, wherein
   taking further action includes determining whether the database stores a phone number associated with the contact; and
   activating an automated phone system to dial the phone number and request information about the contact.

5. The method of claim 1, wherein
   taking further action includes determining whether the database stores a phone number associated with the contact; and
   activating an automated phone system to dial the phone number and provide information about how to access the webpage.

6. The method of claim 1 wherein receiving an indication that an email was not delivered to the contact includes receiving an indication that the email has been returned or is undeliverable.

7. A method of automatically importing contact information into a contact database system of one or more contacts of a user, the method comprising:
- providing an automated online questionnaire to the user;
- receiving information in response to the questionnaire;
- determining contact information from the received information;
- storing the determined contact information;
- determining one or more online accounts associated with the user from the received information;
- automatically accessing the one or more online accounts;
- importing contact information from the one or more online accounts;
- merging the imported contact information and the determined contact information;
- storing the merged contact information in the database by populating a number of predetermined data fields for each contact associated with the contact information;
- determining one or more of the predetermined fields associated with a contact is missing information, incomplete, or empty;
- generating a webpage requesting the contact provide information associated with the determined one or more of the predetermined fields; and
- sending an email to the contact including a link to access the generated webpage; and
- monitoring access of the generated webpage to determine whether any information about the contact including the requested information is provided;
- receiving the information about the contact provided via the generated webpage and updating the contact information in the database system with the received information when it is determined that information about the contact is provided; and
- taking further action to resolve the contact information when it is determined that information about the contact has not been provided within a predetermined period of time.

8. The method of claim 7 wherein merging includes removing duplicate information or contacts.

9. The method of claim 7 wherein sending an email includes sending an email addressed to two or more email addresses that are associated with the contact.

10. The method of claim 7, wherein
- taking further action includes informing the user that the request regarding contact information is unresolved.

11. A method of automatically maintaining contact information in a database system of one or more contacts of a user, the method comprising:
- storing one or more greeting events, indicating a temporal occasion for the user to engage in communication with the contact, in the data base system;
- determining an occurrence associated with one of the greeting events;
- automatically generating an email in response to the determined occurrence, the email including a greeting corresponding to the temporal occasion and a link with a request for verification of the accuracy of contact information of the contact;
- generating a webpage requesting information from the contact or confirmation of information about the contact in response to activation of the link;
- monitoring access of the generated webpage to determine whether any information about the contact including the requested information or the confirmation of information about the contact is provided; and
- receiving the information about the contact provided via the generated webpage and automatically updating the contact information in the database based on the received information when it is determined that information about the contact is provided.

12. The method of claim 11 wherein automatically generating the email includes providing a link in the email configured to provide access to the webpage.

13. A system to automatically maintain digital contact information in a database of one or more contacts of a user, the system comprising:
- an input configured to receive an indication that an email addressed to a contact of the user did not reach its intended destination;
- a processing device configured to determine from the indication that the contact did not receive the email;
- determine contact information associated with the contact and stored in the database, generate a webpage requesting information from the contact or confirmation of the accuracy of contact information associated with the contact, and
- generate an email addressed to the contact including a link configured to provide access to the generated webpage; and
- an output configured to send the generated email to the contact, wherein
- the processing device is further configured to monitor access of the generated webpage to determine whether any information about the contact including the requested information or the confirmation of information associated with the contact is provided; receive the information about the contact provided via the generated webpage and update the contact information in the database system with the received information when it is determined that information about the contact is provided; and taking further action to resolve the contact information when it is determined that information about the contact has not been provided within a predetermined period of time.

14. The system of claim 13 wherein the generated email is addressed to two or more email addresses stored in the database that are associated with the contact.

15. The system of claim 13 wherein the processing device is further configured to inform a user that the request for contact information has not been resolved after expiration of the predetermined period of time.

16. The system of claim 13 wherein the indication that the email has not been received includes one of a returned email and an indication the email is undeliverable.

17. The system of claim 13 further comprising:
- an automated phone system configured to dial a phone number associated with a contact and request contact information, wherein the processing device is further configured to determine that the database stores a phone number associated with the contact and to activate the automated phone system to dial the phone number associated with the contact to request the contact information after expiration of the predetermined period of time.

18. The system of claim 17 wherein the request for contact information includes providing information configured to provide access to the webpage.

19. A system to automatically import digital contact information into a contact database of one or more contacts of a user, the system comprising:
- an input configured to receive information from the user in response to an automated online questionnaire; and a processing device configured to conduct the questionnaire, to determine contact information from the received information, to store the determined contact information; to determine one or more online accounts associated with the received information, to access the one or more online accounts using the received information, to import contact information stored by the online accounts; to merge the imported contact information and the determined contact information; store the merged contact information in the database by populating a number of predetermined data fields for each contact associated with the contact information; to determine one or more of the predetermined fields associated with a contact is missing information, incomplete, or empty; to generate a webpage requesting the contact provide information associated with the determined one or more of the predetermined fields; and to generate an email addressed to the contact including a link configured to provide access the generated webpage, wherein the processing device is further configured to monitor access of the generated webpage to determine whether any information about the contact including the requested information is provided; receive the information about the contact provided via the generated webpage and update the contact information in the database system with the received information when it is determined that information about the contact is provided; and taking further action to resolve the contact information when it is determined that information about the contact has not been provided within a predetermined period of time.

20. The system of claim 19 wherein merging includes removing duplicate information or contacts.

21. The system of claim 19 wherein the input is configured to receive information in response to the generated webpage, and the processing device is configured to update the one or more predetermined fields in the database with the received information.

22. A database system to automatically maintain digital contact information of one or more contacts of a user, the system comprising:
a storage device configured to store one or more greeting events indicating a temporal occasion for the user to engage in communication with a contact;
a processor configured to determine an occurrence associated with one of the greeting events and automatically generate an email in response to the determined occurrence that includes a greeting corresponding to the temporal occasion and a link with a request for verification of the accuracy of contact information of the contact;
an output configured to send the generated email to the contact, wherein
the processing device is further configured to generate a webpage requesting information from the contact or confirmation of information about the contact in response to activation of the link; monitor access of the generated webpage to determine whether any information about the contact including the requested information or the confirmation of information about the contact is provided; receive the information about the contact provided via the generated webpage and update the contact information in the database system with the received information when it is determined that information about the contact is provided.

23. A system to automatically maintain digital contact information of one or more contacts of a user, the system comprising:
a database configured to store contact information; and
a content aggregator including:
a contact importer configured to receive contact information associated with the one or more contacts of a user from the user and store the received contact information in the database;
a contact harvester configured to generate a webpage, based on the stored contact information, configured to provide authentication of the stored contact information or solicitation of additional contact information from contacts of the user, and generate an email addressed to a contact identified by the stored contact information including information configured to provide access to the webpage; and
a contact maintainer configured to maintain the stored contact information by invoking the contact harvester in response to one of determining the contact information is incomplete, determining an email addressed to the contact was not received, and an occurrence of a greeting event, wherein
the contact harvester is further configured to monitor access of any generated webpage to determine whether any information about a contact associated with the generated webpage including the authentication of the stored contact information or solicitation of additional contact information is provided; receive the information about the contact associated with the generated webpage provided via the generated webpage and update the contact information of the contact associated with the generated webpage in the database system with the received information when it is determined that information about the contact associated with the generated webpage is provided; and taking further action to resolve the contact information of the contact associated with the generated webpage when it is determined that information about the contact has not been provided within a predetermined period of time.

* * * * *